G. A. NEWSAM.
Combined Fruit-Press, Filter and Funnel.

No. 161,816. Patented April 6, 1875.

UNITED STATES PATENT OFFICE.

GEORGE A. NEWSAM, OF BROOKLYN, NEW YORK.

IMPROVEMENT IN COMBINED FRUIT-PRESSES, FILTERS, AND FUNNELS.

Specification forming part of Letters Patent No. 161,816, dated April 6, 1875; application filed February 18, 1875.

*To all whom it may concern:*

Be it known that I, GEORGE A. NEWSAM, of Brooklyn, in the county of Kings and State of New York, have invented a new and useful Combined Fruit-Press, Filter, and Funnel; and I do hereby declare that the following is a full, clear, and exact description of the same, reference being had to the accompanying drawing, making part of this specification.

This invention relates to apparatus employed for expressing the juices from lemons, other fruits, &c. My invention consists, first, in a lever hinged at one end to a frame-work, and provided with a removable plunger, said supporting - frame being constructed with a recess, within which fits a removable perforated bowl, and also with a groove, in which fits a funnel for conducting the extracted juice to a vessel placed for its reception; second, in combining, with the perforated bowl of a fruit-pressing apparatus, a removable funnel arranged within the frame which supports the bowl, and a filter arranged within the said funnel for straining the extracted juice, all of which will be fully hereinafter described.

Figure 1:
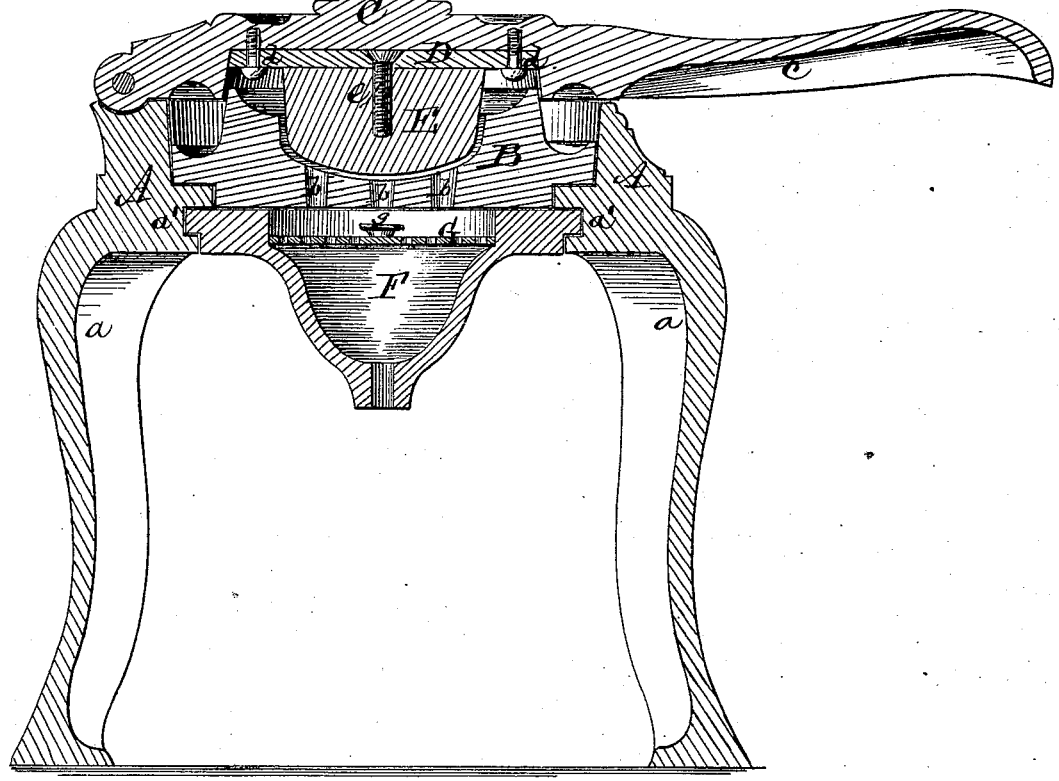
Figure 2:
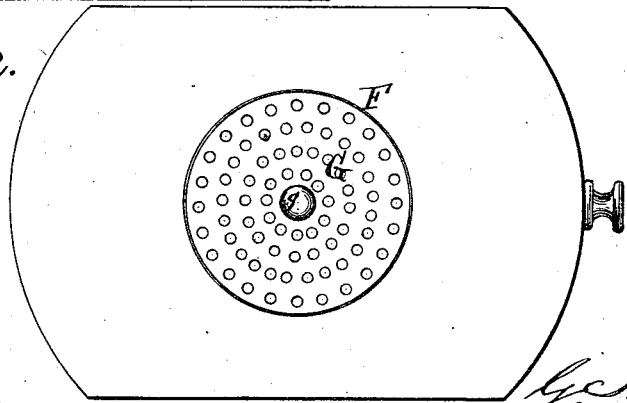

In the accompanying drawing, Figure 1 is a central vertical section of the apparatus. Fig. 2 is a top view of the removable filter and funnel.

A represents a frame of any suitable construction, provided with legs $a$, which may have feet sufficiently broad to hold it in position, or may be so arranged that it may be secured to a board or table by screws. In the frame A rests the removable perforated bowl B, which may be of any suitable material, but preferably of porcelain or crockery-ware. Outside of the concave portion the bowl may be of any suitable conformation corresponding with that of the frame A, so as to rest loosely and fit properly therein, and be readily removed. The perforations $b$ in the bowl B are large enough to allow the passage through them of the seeds and pulp of the fruit when pressed by the piston or follower. To one side of the frame A is hinged a lever or plate, C, corresponding in form with the frame A, so as to cover the same, and provided with a handle, $c$, for operating it. To the plate or lever C is attached, by screws $d$, a plate, D, which sets in a recess in the plate C. To the plate D is attached, by a screw, $e$, a plunger or follower, E, corresponding in form with that of the bowl B, which plunger or follower may be made of wood, porcelain, or any other suitable material.

It is made detachable from the plate in order that it may be removed for the purpose of cleaning it, or replacing it with a new one when necessary.

The plate D extends outward from the plunger after the manner of a flange. The screw $e$ passes into the plunger from the upper or inner side of the flange-plate D, and is thereby concealed and protected.

In the under portion of the frame or support A, grooves $a'$ are provided for the reception of a plate, in the center of which is a funnel, F, which may be in one piece with the plate, or may be made and attached separately. It is preferably made of porcelain or crockery-ware. Over the top of the funnel rests a filter or strainer, G, which may be of metal or of porcelain or crockery-ware, and may be provided with a knob, $g$.

The fruit to be pressed is placed in the bowl B, and pressure is applied thereto by the plunger or follower E, so as to express the juice and force it, together with the seeds and pulp, through the perforations $b$ to the filter G, which strains the same, allowing the juice to pass through, but arresting the seeds and pulp, and retaining them on the upper side of the filter, so that they may be removed by withdrawing the funnel after the juice has passed through it to a vessel placed for its reception.

This apparatus may be made of any desired size, either small enough to serve as a simple lemon-squeezer, or large enough to be used for pressing a quantity of fruit of any kind.

What I claim as new, and desire to secure by Letters Patent, is—

1. The lever C, hinged to the frame A, and provided with the removable plunger E, in combination with the removable perforated bowl B, fitting a recess in the supporting-frame, and the funnel F, fitting the grooves $a'$ in said frame, all as and for the purpose described.

2. The combination, with the perforated bowl B, of the removable funnel F, arranged in the frame A beneath the said bowl, and the filter G, arranged within the funnel, as and for the purpose described.

GEO. A. NEWSAM.

Witnesses:
 BENJAMIN W. HOFFMAN,
 FRED. HAYNES.